US009886016B2

(12) United States Patent
Bermudez Rodriguez et al.

(10) Patent No.: US 9,886,016 B2
(45) Date of Patent: Feb. 6, 2018

(54) AUTOMATED IRRIGATION CONTROL SYSTEM

(71) Applicant: International Business Machines Corporation, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 14/591,960

(22) Filed: Jan. 8, 2015

(65) Prior Publication Data
US 2016/0202679 A1  Jul. 14, 2016

(51) Int. Cl.
*G06F 11/00* (2006.01)
*G05B 19/042* (2006.01)
*A01G 25/16* (2006.01)

(52) U.S. Cl.
CPC .......... *G05B 19/042* (2013.01); *A01G 25/16* (2013.01); *G05B 2219/2625* (2013.01)

(58) Field of Classification Search
CPC ............................. G05B 19/042; A01G 25/16
See application file for complete search history.

(56) References Cited

U.S. PATENT DOCUMENTS

| | | |
|---|---|---|
| 4,209,131 A | 6/1980 | Barash et al. |
| 5,220,876 A | 6/1993 | Monson et al. |
| 5,246,164 A | 9/1993 | McCann et al. |
| 5,913,915 A | 6/1999 | McQuinn |
| 5,919,242 A | 7/1999 | Greatline et al. |
| 6,141,614 A | 10/2000 | Janzen et al. |
| 6,199,000 B1 | 3/2001 | Keller et al. |
| 6,236,907 B1 | 5/2001 | Hauwiller et al. |
| 6,336,066 B1 | 1/2002 | Pellenc et al. |
| 6,529,615 B2 * | 3/2003 | Hendrickson ......... G01J 3/2803 382/110 |
| 7,412,330 B2 | 8/2008 | Spicer et al. |
| 7,660,698 B1 | 2/2010 | Seelig et al. |
| 7,899,580 B2 | 3/2011 | Cardinal et al. |

(Continued)

OTHER PUBLICATIONS

Devadas et al., "Wireless Sensor Networks for In-Situ Image Validation for Water and Nutrient Management," Proceedings of ISPRS TC VII Symposium, ISPRS, Vienna, Austria, 2010, IAPRS, vol. XXXVIII, Part 7B, pp. 187-192.

(Continued)

*Primary Examiner* — Mark Connolly
(74) *Attorney, Agent, or Firm* — L. Jeffrey Kelly

(57) ABSTRACT

An automated irrigation control comprising crop sensor physically attached to a crop and a light sensitive sensor having a photo-detector for monitoring light intensity of a crop, an irrigation conduit extending along the span of the irrigation zone and adapted to carry fluid, with one or more controllable valves and sensors, growth sensors placed in close proximity of the crop sensors, a computer control system, an irrigation controller, and a communications link between the computer control system, the one or more crop sensor, the three or more growth sensors, and the irrigation controller.

18 Claims, 6 Drawing Sheets

(56) References Cited

U.S. PATENT DOCUMENTS

| | | | |
|---|---|---|---|
| 8,325,030 | B2 | 12/2012 | Townsend et al. |
| 9,451,745 | B1* | 9/2016 | O'Shaughnessy ....... A01G 7/00 |
| 2002/0183935 | A1* | 12/2002 | Skinner .................. A01G 17/02 |
| | | | 702/19 |
| 2003/0152292 | A1* | 8/2003 | Scott ..................... G06T 3/4053 |
| | | | 382/298 |
| 2001/0260400 | | 11/2007 | Morag et al. |
| 2012/0109387 | A1 | 5/2012 | Martin et al. |
| 2012/0124902 | A1 | 5/2012 | Moon et al. |
| 2014/0024313 | A1 | 1/2014 | Campbell |
| 2015/0081058 | A1* | 3/2015 | Oliver .................. A63F 13/245 |
| | | | 700/91 |

OTHER PUBLICATIONS

O'Shaughnessy et al., "Developing Wireless Sensor Networks for Monitoring Crop Canopy Temperature Using a Moving Sprinkler System as a Platform," Applied Engineering in Agriculture, vol. 26, No. 2, 2010, pp. 331-341.

Vellidis et al., "A real-time wireless smart sensor array for scheduling irrigation," Computers and Electronics in Agriculture, vol. 61, 2008, doi:10.1016/j.compag.2007.05.009, pp. 44-50.

\* cited by examiner

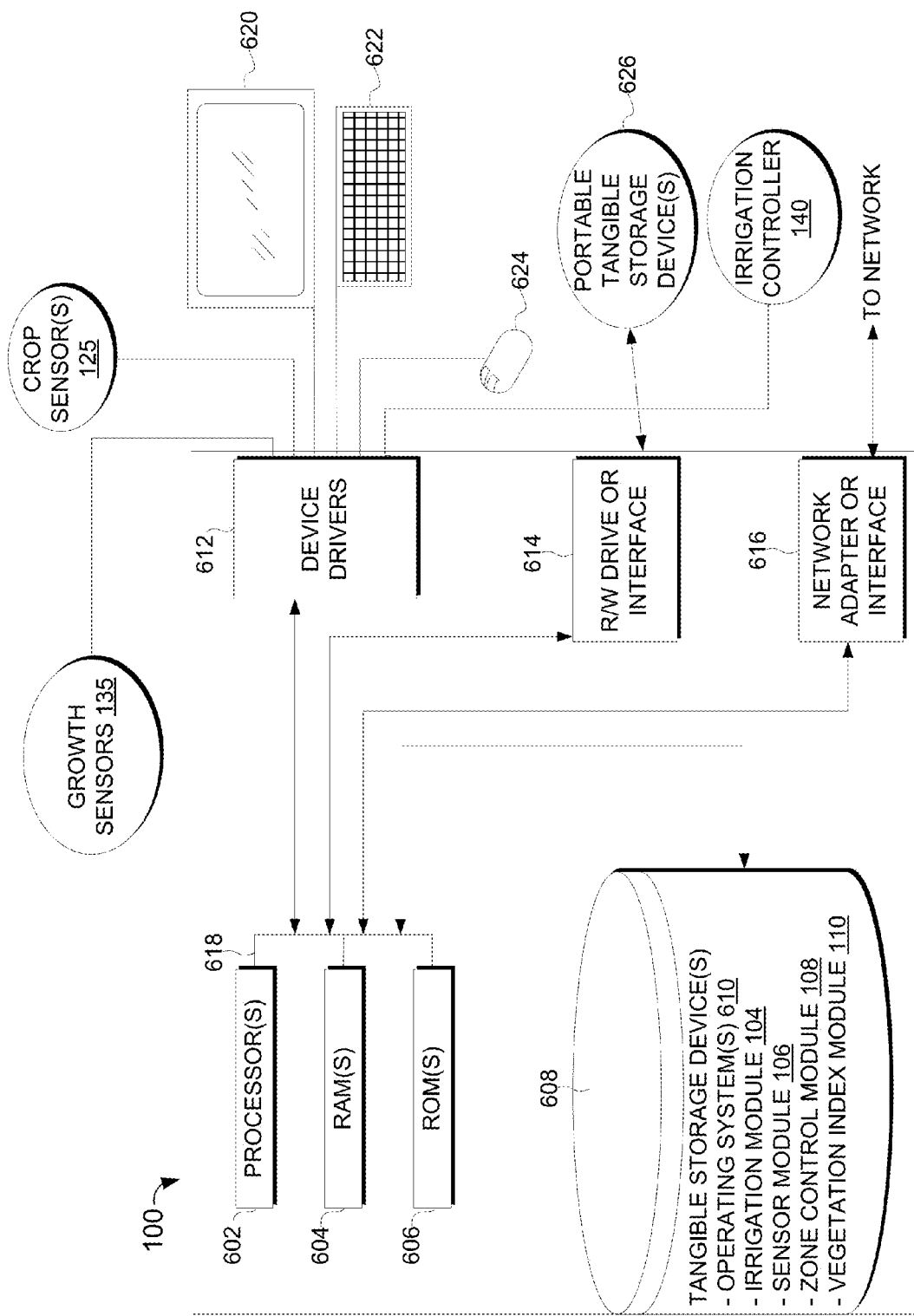

AUTOMATED IRRIGATION CONTROL SYSTEM

BACKGROUND

The present invention relates generally to a method and systems for automatically controlling the intermittent flow of water, and more specifically to the automatic control of flow with respect to irrigation systems.

In the field of crop irrigation, there is a natural need for automated software tools and applications that may assist an owner in site operation, proper irrigation of a site for proper delivery of nutrients or pesticides to plants, and accurate crop data collection. For example, it may be desirable to have access to an automated interactive system which could be used to optimize or update an irrigation schedule in real time based on data collected from a crop, metrological conditions, soil conditions, and type of crops being irrigated. Such an automated interactive system can prevent plants from entering into a stressed state by adjusting irrigation in response to plant physiological conditions.

Irrigation systems supply water to soil. They are primarily used to assist in the growing of agricultural crops and maintenance of landscapes. Irrigation systems typically include valves, controllers, pipes, and emitters such as sprinklers or drip tapes. Irrigation systems are usually divided into zones based on the spatial resolution of the detection system, and irrigation is performed on that zone based on reflection from all the crop plants within that zone. Each zone may have a solenoid valve controlled via irrigation controller opening or closing irrigation zones. The irrigation controller may be a mechanical or electrical device signaling a zone to turn start irrigating a section of crop for a specific amount of time, or until it is turned off manually. It is desired that the number of control points in the system be individually addressable, however, all points that perform the same command may be connected in order to reduce communication over the power/signaling channels and optimize the cost of the technology.

Branch pipes in each zone are fed by a main line or common supply pipe. In existing systems, controllers are typically wired to the solenoid valves and the energy/power to actuate them is provided through a hardwired connection. Water can be pumped into the main line from a well source or a city supply.

More advanced irrigation systems may use smart controllers. A "smart controller" is typically a controller that is capable of adjusting the watering time by itself in response to current environmental conditions. Smart controllers determine current conditions using real time sensor data, historic and predicted weather data for the local area, soil moisture sensors (water potential or water content), size of the canopy, and greenness of the leaves, weather stations, or a combination of these.

Weather based smart controllers may provide a one dimensional answer to issues faced by irrigation sites. Although they may adjust the irrigation schedule for weather changes, and irrigate based on the needs of the field and, or landscape, they cannot account for other variables in the field, such as crop health or growth cycles. A smart controller may automatically reduce the watering times or frequency as the weather gets cooler determining that less water is needed, it does not take into account the individual need of the plants.

Systems utilizing individual plant health in a field under cultivation are known. For example, U.S. Pat. No. 5,220,876 discloses a variable rate fertilizer spreading apparatus that uses a soil map, (which may be acquired, for example, from an aerial infrared photograph), in order to determine the amount of fertilizer that is to be applied at each location within the field. For this purpose, a map is prepared (referred to as a "fertilizer map"), which shows a spatially distributed desired fertilizer level throughout the field, as well as a "status" map which shows corresponding existing fertilizer distribution throughout the field. The desired distribution of fertilizer as recorded in the "fertilizer map" is prepared in advance, based on determined physical characteristics of the field itself, including field topography, soil type, drainage, sun exposure, and the like. In order to provide for application of the proper amount of fertilizer to achieve the desired distribution, an "Expert System" utilizes artificial intelligence to perform the necessary calculations, based on the fertilizer map, the status map, the soil type and the types of chemicals that are being applied.

In a prescription forming control system disclosed in U.S. Pat. No. 5,919,242, a navigation controller controls the delivery rate of agricultural products by an applicator vehicle, as a function of the global position of the vehicle, based on digital maps which divide a field into "zones", according for example to soil types. Several different products are delivered at differing rates depending on the soil content and the types of crops that are being cultivated. Similarly, U.S. Pat. No. 5,913,915 also discloses a multi-variable dispensing rate applicator for agricultural products in which a computerized control system stores a digital soil map containing information concerning the location of types of soils, topographic features, nutrient levels, soil compaction, drainage and the like. A map coordinate system allows for variable input control from side to side relative to the movement of the applicator system.

U.S. Pat. No. 6,199,000 B1 provides a precision farming method in which seeding, cultivating and/or harvesting operations are controlled using GPS technology in conjunction with a digital map of an agricultural field, which may be created using satellite, aircraft or other overhead imagery. High resolution photographs acquired in this manner are used to generate the digital map. According to this disclosure, relevant information can then be stored in the map (location of irrigation systems, previous planting locations of other crops and the like), and used to determine, for example, the location at which new crops/seeds should be planted.

Similar systems, in which soil characteristic maps are used to control automated agricultural machines are disclosed in U.S. Pat. Nos. 6,236,907 B1; 6,336,066 B1 and 6,141,614.

Each of the above prior art systems is based on the premise that the likely development of a crop planted in a particular field can be calculated based on physical soil and field conditions, such as the type of soil, topography, drainage, existing nutrient levels, compaction, etc. Accordingly, such information concerning soil and field conditions is stored in the form of a map or maps, which are then used to determine an optimum distribution of fertilizer or the like, based on complex, in some cases proprietary, algorithms. (See, for example, U.S. Pat. No. 5,220,876 at Column 8, lines 58 et seq.)

Such systems share the common deficiency that maps may have inherent variability from the moment was are created and may rely on GPS localization that is accurate at the level on the order of tens of feet. If the variable dispensing system needs to rely on a similar GPS localization system, the accuracy of the water/nutrients may be impaired as water/nutrients may be delivered to the wrong location, due to errors introduced by the GPS systems. The variable rate system is assuming that a mobile platform will move through the field and adjust the delivery of water/nutrients based on the map. One shortcoming of the above mentioned techniques is the two dimensional imaging of the top of the canopy yielding little information about the three dimensional shape and size of the plants. For example, satellite observation of the canopy having a spatial resolution of 30 meters by 30 meters will have reflection data from multiple plants/crops, making individual plant management impractical to implement. For single plant management it is desirable to have local sensor that can assess the condition of independent plants and be able to control the nutrients are delivered to individual plants. Without an accurate estimation of the biomass (volume of plant), for example, the estimation based on top imagery, the wrong amount of nutrients may be delivered. Variability may also reflect only the soil and other physical field characteristics, and in some instances the type of crop being cultivated. While these may be reasonable prognosticators of likely crop development, they do not and cannot take into account or adjust for actual crop growth due, for example, to the effects of weather, diseases, insects and the like. Nor can they take into account the effects of weather on the materials themselves after they have been applied—such as for example due to heavy rains and attendant runoff. They are also generally incapable of generating time variable dynamic crop prescriptions based on actual crop development throughout the growing season. Delivery of nutrients, multiple times per day, using a mobile platform may not be feasible due to time constrains in the operational efficiency.

Accordingly, it is an object of the present invention to provide a method and apparatus for controlling a spatially variable rate delivery apparatus for applying irrigation, fertilizer, and/or pesticides delivery through an irrigation infrastructure that may grow crops in a cultivated field which dynamically takes into account actual crop development throughout the growing season.

Another object of the invention is to provide such a method and apparatus for controlling application rates for agricultural irrigation, which automatically takes into account the effects of weather, disease and insects on crop development. Control system may need to optimize the delivery of instructions across the communications channels to increase time efficiency.

Another object of the invention is to provide a method and apparatus for the efficient delivery of variable rate scheduling across a large area, for example a farm, where multiple communication paths may be needed. The communication paths may be combined and may transfer information via wireless and wired pathways. Wireless and wired pathways may be combined to acquire sensor data and deliver the sensor data to a central computer that will communicate the data to control nodes. The information may be distributed from a central computer to a gateway based on the time-frame determined by an irrigation schedule that is delivered. The use of gateways may allow a partial or complete shut down of the system in case of a malfunction. Real time sensor data from the field may be integrated at the central computer such that the central computer will determine the required resource (water, fertilizer, and/or pesticide), optimize the delivery, and create priority list based on the availability of the resources.

SUMMARY

Embodiments of the present invention disclose a system and method for an automated irrigation control and communication between a central computer and multiple control nodes that are distribute over an irrigation area and can be activated from a distributed gateway system or from the central computer. A system comprising crop sensor physically attached to a crop and a light sensitive sensor having a photo-detector for monitoring reflection of a crop as an indicator of the greenness of the canopy or the temperature of the crop. The irrigation system includes irrigation conduit extending along the span of the irrigation zone and adapted to carry fluid, with one or more controllable valves and sensors. The system includes RFID enabled sensors placed in close proximity of the crop sensors and a computer control system. The irrigation conduit may be connected to the irrigation controller, and activates the one or more controllable valves, and receives data from sensors coupled to the irrigation controller. The irrigation system can deliver, based on the sensor data, water, fertilizer, or pesticides on certain location of the system for differential management down to a single plant level. The system enable efficient management of crops taking into account local conditions. The system also includes a communications link between the computer control system, the one or more crop sensor, the three or more growth sensors, and the irrigation controller.

BRIEF DESCRIPTION OF THE SEVERAL VIEWS OF THE DRAWINGS

FIG. 6 is a block diagram of internal and external components within the computer control system of FIG. 1, in accordance with an embodiment of the present invention.

DETAILED DESCRIPTION

Figure 1:
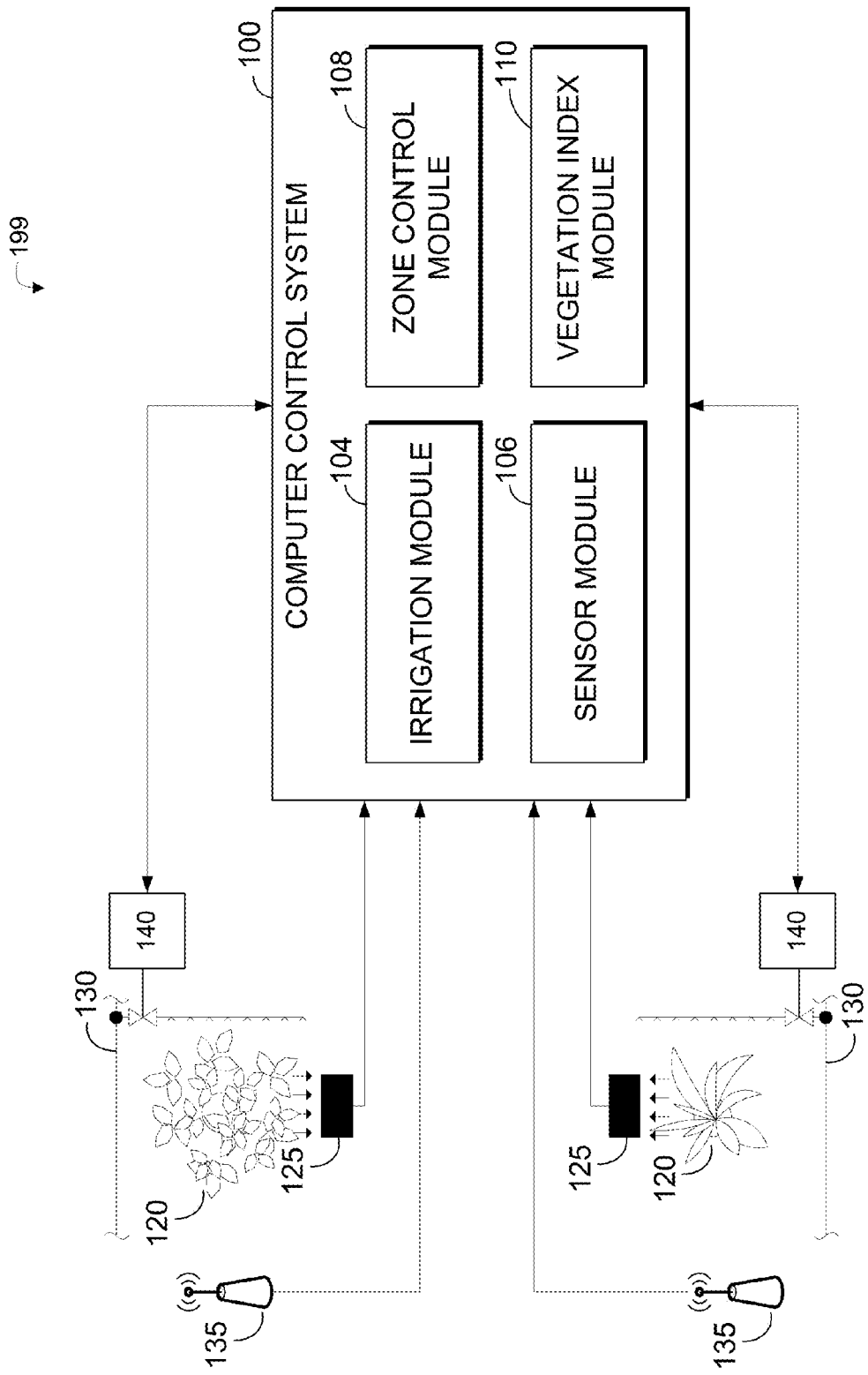
FIG. 1 is a schematic representation of an irrigation system, in accordance with an embodiment of the present invention.

The present invention may be an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic representation of an irrigation system, in accordance with an embodiment of the present invention. Irrigation system 199 includes a crop sensor 125 that acquires digital spectral information, or a spectral image, and growth data, of a crop 120. It may also contain irrigation piping 130, an irrigation controller 140, and growth sensors 135 located near the crop sensor 125. The growth sensors 135 may utilize the position of the crop sensor 125, rigidly attached to crop 120 to determine its growth over a temporal period. Crop sensors 125 and growth sensors 135 may asses the canopy and growth rate of crops 120 and determine the health off the plant through spectral information in order to determine different resource crops 120 may require.

The irrigation piping 130 may include multiple delivery sections, a plurality of irrigation tubes, allowing the flow of resources, for example, water, to be controlled by solenoid valves that are disposed along each of the multiple water tubes, and a main water distribution line. Each of the multiple water delivery sections may be fluidly coupled to the water distribution line wherein the water distribution line provides a fluid, such as water, fertilizer, or pesticides dissolved in water, to each of the multiple water tubes to be deposited around the crop 120.

The irrigation controller 140 includes a processor coupled to a memory, at least one input and an output. In some embodiments, connections to computer control system 100 are coupled to the at least one input in order to provide signaling that corresponds to sensed or measured data image. Furthermore, in some embodiments, the input may also function as an output allowing for bi-directional communication between the computer control system 100 and the crop sensors 125. The output may be any output to cause or interrupt irrigation or may be a control output to provide messages to cause or interrupt irrigation.

According to several embodiments, the irrigation controller 140 comprises a programmable irrigation controller that controls water flow to one or more irrigation stations, where each irrigation station comprises a water flow control device such as a solenoid valve or pump (not shown in FIG. 1). In many embodiments, the irrigation controller 140 is adapted to automatically receive sensed data image and plant growth data from the crop sensor, transmit such information to computer control system 100, and if irrigation is needed, receive commands from the computer control system 100 and automatically execute, adjust or interrupt watering schedules on a periodic basis.

In some embodiments, the irrigation controller 140 may store historical values of one or more of the variables needed to calculate the plant water requirements. In several embodiments, for example, the irrigation controller 140 stores historical geo-location values associated with a data image or plant growth.

A computer control system 100 may receive spectral image data of an individual crop 120 from crop sensors 125 and may store it in a sensor module 106, where it is processed into a form which can be used by a vegetation index module 110. The spectral image data may comprise a value of reflected solar radiation from canopy of crop 120. The image to be analyzed is taken so that it comprises as much vegetation as possible. Preferably the image is provided perpendicularly to the ground, normally at a distance of 0.1-2 m. It is also possible to provide the image from aside of the vegetation, so called panorama image. Preferably the image to be analyzed is taken so that the area and vegetation to be imaged is protected from direct sunlight. The image received by the sensor module 106, is further forwarded to the vegetation index module 110 comprising means for dividing the image into sub-areas comprising a number of image units, such as pixels; means for determining the amount of certain colors and their ratios in the sub-areas of the image; and means for calculating vegetation index or indices on basis of the determined color amounts and ratios.

The image can be divided into sub-areas in a desired manner. The number of image units forming an image sub-area can be chosen, for example, on the basis of image units comprised in the original received image. If the original image has a high resolution, one sub-area can comprise 2, 3 or 4 image units. If the resolution of the original image is low, one sub-area may comprise one image unit. Preferably the image to be analyzed is dived into sub-areas, each of which comprises one image unit.

According to an embodiment of the invention the amount of certain colors and their ratios are then determined in the sub-areas of the image. Preferably relative amounts of red, green and blue colors in the image and the ratios between red and green, red and blue and green and blue color bands are used for determining vegetation index or indices. A typical digital image contains three color bands, for example red, green and blue. Each image unit of an image typically comprises a value ranging from 0 to 255 for each band. The simple relative index can be calculated for red band as follows:

$$\text{Red Band Index} = \frac{R}{(R+G+B)}. \quad \text{Formula 1}$$

where R refers to red, G for green and B for blue band value. The ratio for red and green can be calculated as follows:

$$\text{Red to Green Ratio} = \frac{R}{G}. \quad \text{Formula 2}$$

The vegetation index, VARI, may be calculated as follows:

$$VARI = \frac{(G-R)}{(R+G-B)}. \quad \text{Formula 3}$$

These indices are preferably calculated for each image unit. An average value for each index is then calculated for the whole image sub-area under analysis. Optionally, other statistical parameters like most common and median of each index may be calculated.

The color ratios may be used in calculations, instead of absolute color digits, in order to minimize the optical disruption effect varying amounts of incoming light may have on the image to be analyzed. The vegetation index module 110 may calculate indices for the received image on basis of the determined color amounts and ratios. Preferably, a Bayes model is used to classify whether the vegetation of the received image is sufficient or deficient in growth aid by using the calculated variables as independent variables. Other models, like common multiple regression models using vegetation indices as independent variables and growth aid sufficiency index as a dependent variable can also be used for classifying the vegetation. However, multiple classification models, such as Bayes model, usually perform better compared to single variable model commonly used in image analysis applications, for example, a method used by Hoffmann & Blomberg (2004). The effect of errors caused by varying imagining conditions can be generally minimized by using multiple data sets or points instead of one variable.

According to one embodiment of the invention the image received by the vegetation index module may be filtered before determination of the vegetation index or indices. Such filtering may be performed by filtering means that is adapted to differentiate the image sub-areas comprising vegetation information from sub-areas with less information content. The contents of the sub-areas are evaluated so that only sub-areas mainly describing vegetation are accepted for determination of the vegetation indices. For example, only sub-areas of which over 50%, typically over 60%, more typically over 70%, preferably over 80%, more preferably 90%, sometimes 100% of the area describes the vegetation are accepted for vegetation indices determination. Sub-areas not fulfilling the criteria are removed from further determination. In this way parts of the image that could distort the final result can be filtered away.

According to an embodiment of the invention the vegetation index module 110 located in the computer control system 100 may comprise a database for storing the obtained vegetation index or indices, together with the identification code, and optionally the image attribute, which was received with the image. The information relating to the imaging location may be acquired from the crop sensor 125 and saved as data defined by position coordinates and/or the field name (discussed in more detail in FIG. 2A).

The analyzed data can be stored for further use within computer control system 100. For example, a data base may be formed to aid the farm owner in conducted image analysis. As such, database's accuracy will increase where the images are stored from the same site and location conducted at the same location every year and referenced. The information stored, covering a longer time period, for example a whole vegetation period, or two or more vegetation periods, can be obtained by sending a special command to the system. Vegetation index module 110 can then compile the required information, whereby it can be sent to the defined receiver by the communication module. Such a database may then help to adjust management actions for a future season.

The vegetation index or indices may also be optionally compared with reference values in order to obtain vegetation status information for the vegetation to be analyzed. After the determination of the vegetation index or indices for the received image, the image analysis module instructs the database module to retrieve the reference data associated with that identification code. After receiving the reference index/indices, the image analysis module performs a comparison between the index/indices of the received image and reference index/indices. The comparison can be done by using statistical methods, such as naive Bayes classification model (Kontkanen et al., 1998). As a result of this comparison, vegetation status information is obtained for the received image. The vegetation status information is usually classified, for example in number of different classes, such as "high", "above average", "average", "below average", "low". Each class comprises a certain range of vegetation index values.

The analysis of the image performed by the vegetation index module 110 coupled with growth rates recorded by the growth sensors 135 may reveal accurate near real-time water, or fertilization needs of a crop 120, wherein the irrigation module can coordinate irrigation by generating irrigation schedules or be programmed by a user with irrigation schedules for the respective location identified, based on the analyzed image. The irrigation schedules, in some instances, define run times and, or desired amounts of water to be supplied through the irrigation piping 130. Further, the irrigation schedules often define start times or time periods when the irrigation scheduling can be implemented. Accordingly, this allows the computer control system 100, irrigation module 104, and zone control module 108 to manage start times and durations to specific crop locations.

Zone control module 108 may contain specific divisions of the irrigation area and cooperate with the irrigation module 104 in determining the schedule and proper section to irrigate. Zone control module 108 may calculate the amount that will be delivered to the target area identified by vegetation index module 110 by utilizing a plurality of zone parameters. A component of the zone control module maintains a plurality of zone parameters associated with the divisions that comprise the target area. Such divisions may include sections distinguished by manually predetermined areas, type of crops, type of soil or problem areas identified by the vegetation index module 110.

For example, each zone may include information related to the size of the zone, nutrient requirements, pesticide and herbicide requirements, soil conditions, moisture levels, or prior watering needs. The user may enter the zone parameters manually or the zone parameters may be automatically set to nominal values by the vegetation index module 110.

When the irrigation module 104 activates watering for a specific zone, the zone control module 108 may access the zone parameters associated with the specific zone and tailor the amount that is delivered to the zone.

The computer control system 100 can be located at the property being irrigated or be located remote from the property. For example, in some instances the computer control system 100 may be located within wireless transmission range of the irrigation system 199. The irrigation module 104 combines and cooperates irrigation system devices that were not intended to be cooperated within an irrigation system 199. For example, the present embodiments can combine the use of AC powered irrigation control systems with DC battery powered controllers. Further, the irrigation module 104 combines zone control module 108 to implement irrigation schedules over a relatively wide geographic area with controls that may be local to valves, run valve specific schedules. Accordingly, the present embodiments can provide enhanced irrigation control over areas that are typically hard or expensive to incorporate programmed irrigation control while coordinating the controlled irrigation over a wide geographic area or in cooperation with a wide variety of irrigation control devices or irrigation systems.

Figure 2C:
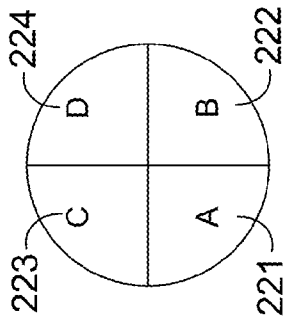
FIG. 2C is a view of a split photodiode filters in the crop sensor, in accordance with an embodiment of the invention.
Figure 2B:
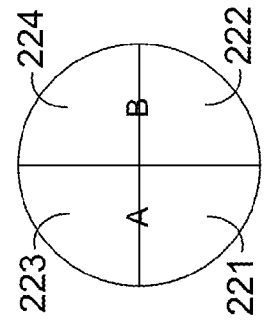
FIG. 2B is a view of a split photodiode filters in the crop sensor, in accordance with an embodiment of the invention.
Figure 2A:
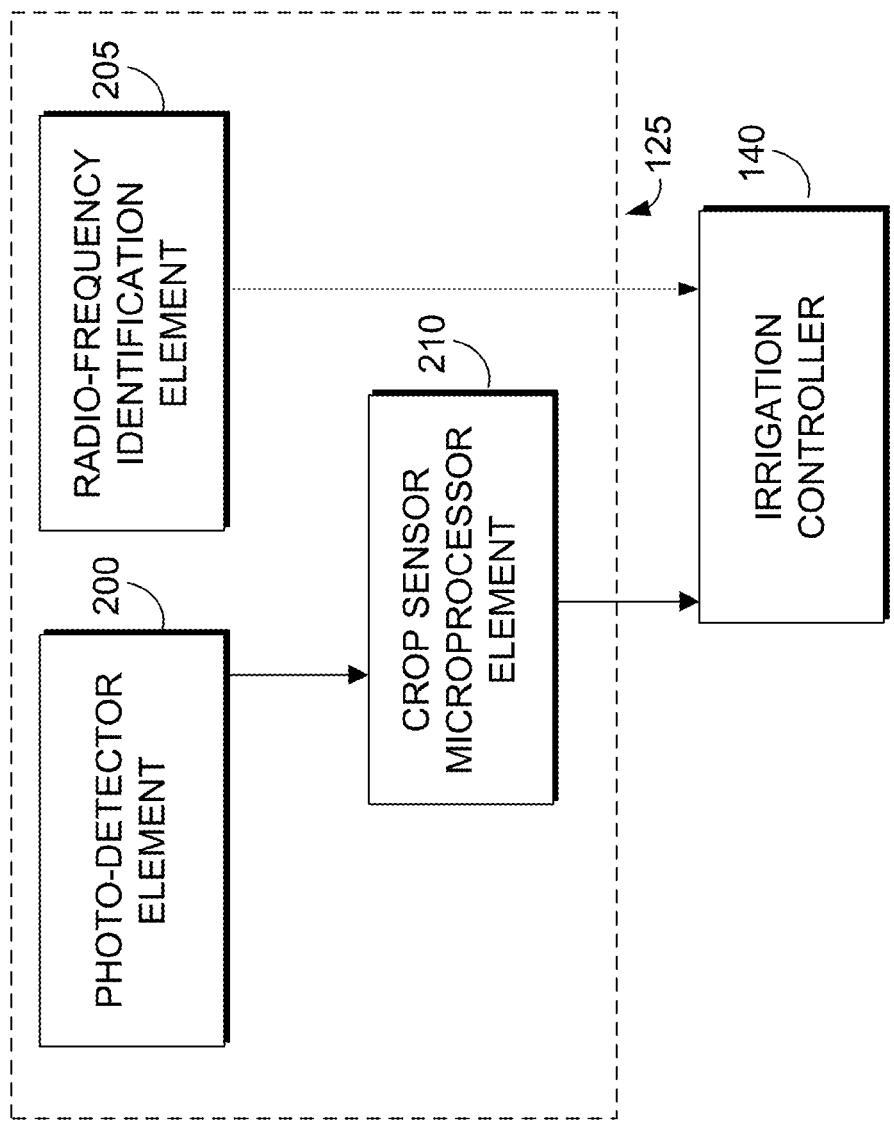
FIG. 2A is a flow chart of the crop sensor, in accordance with an embodiment of the invention.

FIG. 2A is a flow chart of the crop sensor, in accordance with an embodiment of the invention. The elements of the crop sensor 125 include a photo-detector element 200, a radio frequency identification element 205, and a crop sensor microprocessor element 210 in communication with irrigation controller 140.

The role of the crop sensor 125 in the irrigation system 199 is to measure the biomass, or biochemical properties of the crop being monitored. Data produced by the sensor is collected by the crop sensor microprocessor element 210 for storage. Each sensor point is geo-referenced using radio frequency identification included in the radio frequency identification element 205 of the crop sensor 125 body.

There are two primary ways in which crop data can be taken in the system. First, the image collected by the system, can be all inclusive, where every data point measured by the sensor can be stored away in the crop sensor microprocessor's element 210 memory for later retrieval and analysis by the computer control system 100 through irrigation controller 140. Second, the crop sensor 125 can be programmed with a defined set of rules so as to distinguish poor performing regions of the irrigation site from good or healthy regions and vice versa and store only the poor performing regions. This mode of operation saves storage space in the controller and reduces the amount of data processing that has to be performed.

The crop sensor 125 may either emit light which is then reflected back to a receiver, referred to herein as an "active sensor" since the sensor actively produces its own light, or a sensor may take advantage of available light to measure reflectance properties which, for purposes of this invention, is referred to as a "passive sensor". Either sensor is well suited for use as a photo-detector element 200. Simply by way of example and not a limitation, the operation of the photo-detector element 200 is described in terms of a passive sensor. The crop sensor 125 is to be directly mounted and facing the canopy of the crop 120 (not shown in FIG.

2A). Light reflected from plant 120 passes through an emitter lens (not shown) of the photo-detector element 200. The phase of the scattered light impinging upon photo-detector element 200 is used to assess the spectral reflectance characteristic of the scattered light. The data recorded by each crop sensor 125 is then accessed by the crop sensor microprocessor element 210. An analogue-to-digital converter located within crop sensor microprocessor element 210 of each crop sensor 125, converts the radiance detected in the wavelength, into electrical signals, which are then sent to its local irrigation controller 140.

The crop sensor 125 may also be used for determining crop growth parameters and geo location through the radio frequency identification element 205. The radio frequency identification element 205 may contain a radio frequency identification (RFID) tag which is operatively connected to irrigation controller 140 of particular crop sensor 125. The crop sensor 125 integrates an RFID tag that are actuated as electrical switches at thresholds of conditions, such as acceleration (crop growth) or initiation of image transfer by the crop sensor microprocessor element 210 to the irrigation controller 140. The onboard data collection and storage components are powered only when those thresholds are exceeded. For example, the irrigation controller 140 receives a recorded image along with the radio frequency of the RFID tag, the reflected radiation provides location information and growth history. Attaching the crop sensor 125 with a RFID tag allows for dimensionally characterizing a target structure of the crop 120 over a specified temporal period (discussed in more detail in FIG. 4). For example, a RFID tag included in the radio frequency identification element 205 facilitates can characterize the height for one target crop taken from ground level by continuously recording the strength of the signal from the RFID tag to the receiver at controller 140 and may assess the three dimensional distance from the RFID tag to controller 140, where controller 140 is in a fixed position, over a period of time.

FIG. 2B is a view of a split photodiode filter in the crop sensor, in accordance with an embodiment of the invention. A portion of natural light, or illumination light, which has been reflected by a crop passes through color filters A and B. The lens system, and filters are respectively formed in four quadrants as divided by orthogonal coordinate axes into quadrant 1 221, quadrant 2 222, quadrant 3 223, and quadrant 4 224. A portion of light passes through the lens systems of photo-detector element 200, forming data images. Each of the lens systems may be preferably a combination of lenses which are arranged along an optical axis in such a manner as to achieve a desired optical performance. However, each lens system will be conveniently described as a single lens for simplicity.

In various embodiments, the crop sensor may have a split detector where the orientation of the sensor can be adjusted to have the reflected light focused on the middle of the split detector. Focus on the middle of the split detector may be achieved by adjusting the orientation of the split detector until the difference between the signals received by each section of the split detector is equal. The position of the split detector may be adjusted by a small motor that orients the split detector in order to maximize the signal that is captured.

The color filters A and B are respectively formed in two halves on the filter substrate plane, and have a substantially zero transmittance for light of wavelengths other than in the vicinity of red, and light of wavelengths other than in the vicinity of infrared, respectively. Although the color filters A and B of the present embodiment are illustrated to be on the same plane in FIG. 2B, the color filters A and B may alternatively be placed on different planes from one another.

In an exemplary embodiment of the invention the split filter arrangement, near-infrared and red cut filters are formed only over one-half of a photosensitive element. In accordance with the present invention, structures and methods are provided for assessing plant status using the chlorophyll status changes and biomass properties of the plant remotely sensed, in the red-edge portion of the vegetative reflectance spectrum of 650 nm to 900 nm, thereby allowing selective monitoring or treatment of individual plants. Preferably, the photo-detector element 200 will contain two narrow filters covering the red and infrared spectrums, where filter A covering the red spectrum will have a bandwidth of 650 nm and filter B covering infrared spectrum will comprise a bandwidth of 880 nm.

The positive relationship between leaf greenness and crop health status means it should be possible to determine crop health requirements based on reflectance data collected from the crop canopy (Walberg et al., 1982; Girardin et al., 1985; Hinzman et al., 1986; Dwyer et al., 1991) and leaves (McMurtrey et al., 1994). Healthier plants typically have more chlorophyll (Inada, 1965; Rodolfo and Peregrina, 1962; Al-Abbas et al., 1974; Wolfe et al., 1988) and greater rates of photosynthesis (Sinclair and Horie, 1989). Hence, plants that appear a darker green are perceived to be healthier than deficient plants and as such healthier plants reflectance less light in the visible portion of the spectrum (400 to 700 nm) and reflect more light in the near infrared (>700 nm). Chlorophyll in leaves absorb strongly in the blue and red regions of the spectrum (460 nm and 670 nm) and as the wavelengths increase past 670 nm the leaves begin to strongly reflect infrared light, (see FIG. 2C). The transition region between the photosynthetic portion (400 nm to 670 nm) and the biomass portion (>780 nm) of a plant's reflectance spectrum is sometimes referred to as the red-edge region. It has been reported in literature that the wavelength where the maxima of the derivative 6 for the red-edge band occurs is strongly correlated to changes in the chlorophyll status of a plant. Guyot and Baret (1988) developed an algebraic relationship expressing the wavelength of the red-edge inflection point (REIP), sometimes referred to as the red edge position (REP), using four reflectance bands spanning from 670 nm to 780 nm. The usefulness of measuring red-edge reflectance spectra, and subsequently determining the inflection point's wavelength position, is that the chlorophyll status of the plant can be measured independently of soil background interference. That is, the chlorophyll status as denoted by shifts in the red-edge inflection point is independent of the slope of the vegetative reflectance curve and has reduced sensitivity to soil and biomass reflectance characteristics. Shifts in the value of the inflection point are directly related to the chlorophyll status (and water content) of the plant with chlorophyll content being closely related to nutrient status.

Furthermore, to improve the quality of the image the crop sensor microprocessor element 210 of FIG. 2A may correct the image based on the quadrants of FIGS. 2B and 2C. If a photo-detector element 200 contains two filter apparatus mentioned in FIG. 2B, a clearer image can be achieved through a ratio of quadrant data values:

$$\text{Two Filter Correction} = \frac{(A + C - B - D)}{(A + B + C + D)}. \qquad \text{Formula 4}$$

where quadrant 1 221 represents A, quadrant 2 222 represents B, quadrant 3 223 represents C, and quadrant 4 224 represents D.

FIG. 2C is a view of a split photodiode filters in the crop sensor, in accordance with an embodiment of the invention. Similarly to FIG. 2B, the lens systems and filters are respectively formed in four quadrants as divided by quadrant 1 221, quadrant 2 222, quadrant 3 223, and quadrant 4 224.

The filters A, B, C, and D, discussed in detail above, are four split parts of an otherwise single photo-detector, respectively corresponding to four quadrants. The four quadrant split may compensate for light reflection differences during a growing season and/or minimize the impact of the background signal as the canopy changes during a growing season.

The filters A, B, C, and D are for red detection, green detection, blue detection, and infrared detection, respectively. In the present embodiment, the filters A, B, C, and D share the same lateral magnification.

Figure 3:
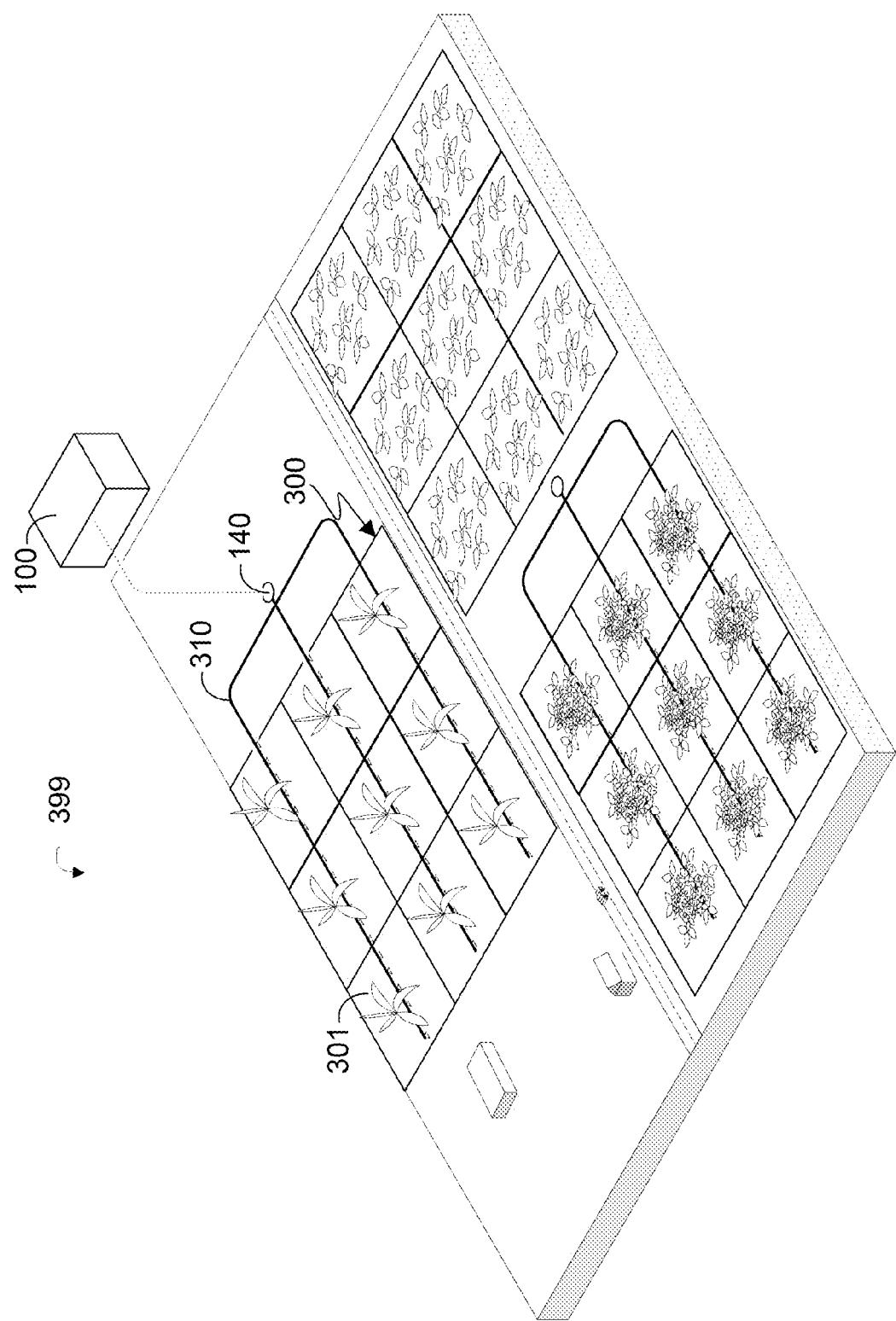
FIG. 3 is a schematic block diagram illustrating field data flow in an irrigation system environment, in accordance with an embodiment of the present invention.

FIG. 3 is a schematic block diagram illustrating field data flow in an irrigation system environment, in accordance with an embodiment of the present invention.

The system 399 includes one or more lateral driplines 310 fluidly coupled to a main water supply line. Each of the one or more driplines 310 is divided into zones 301 and comprising an irrigation plot 300 that are separated from one another by a controllable valve, such as a pressure regulating or solenoid valve. The controllable valve can be actuated by a voltage pulse issued from the irrigation controller 140, as described in FIG. 1.

Each of the one or more driplines 310 is equipped with a plurality of emitters such that each dripline 310 has a group of emitters in each zone 301. Each emitter is activated when the controllable valve associated with the corresponding zone is actuated or turned on. The one or more driplines 310 are arranged such that groups of emitters for each one of the driplines 310 may be provided in each zone 301 of irrigation plot 300.

In accordance with embodiments, different or multiple driplines 310 can be grouped together and controlled by the zone control module 108 of computer control system 100 to thereby create "variable rate irrigation" zones. In such an approach, the "variable rate irrigation" zones can be created continuously based on information provided by crop sensors 125 pertaining to crop health. Image data may be used by the computer control system 100 to delineate the "variable rate irrigation" zones and specify the amount of fluid needed in each corresponding location.

In another embodiment, computer control system 100 may utilize other feedback in addition to image data and plant growth provided by crop sensors 125, such additional information can be provided by soil moisture sensors that would monitor the water content in the soil, satellite sensing to monitor the evapo-transpiration of the associated canopy or canopy sensors to measure local water content. Any of the sensing approaches will have a spatial and temporal resolution determined by the detection methods and the resolution will be matched by the length of drip lines segments and by updating the irrigation schedule determined by irrigation module 104 and zone control module 108 within computer control system 100.

The control station 140, as discussed in FIG. 1, is provided as a master unit that is responsible for execution of irrigation schedule as well as other functionalities such as transmitting and receiving data from crop sensors 125.

The irrigation controller 140 may receive and transmit data through wired or wireless connection to sensors, valves and computer control system 100. The irrigation controller 140 configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site; a wireless adapter coupled with the computer control system 100, such that the coupling allows communication with the computer control system 100; a local network at the site, wherein the wireless adapter is configured to communicate over the local network at the site providing access to a communication network with the computer system 100, crop sensors 125, different or multiple driplines 310, wherein the wireless adapter is configured to receive information from the irrigation controller and wirelessly communicate that information to the computer control system 100, and to wirelessly receive information from the computer system 100.

Figure 4:
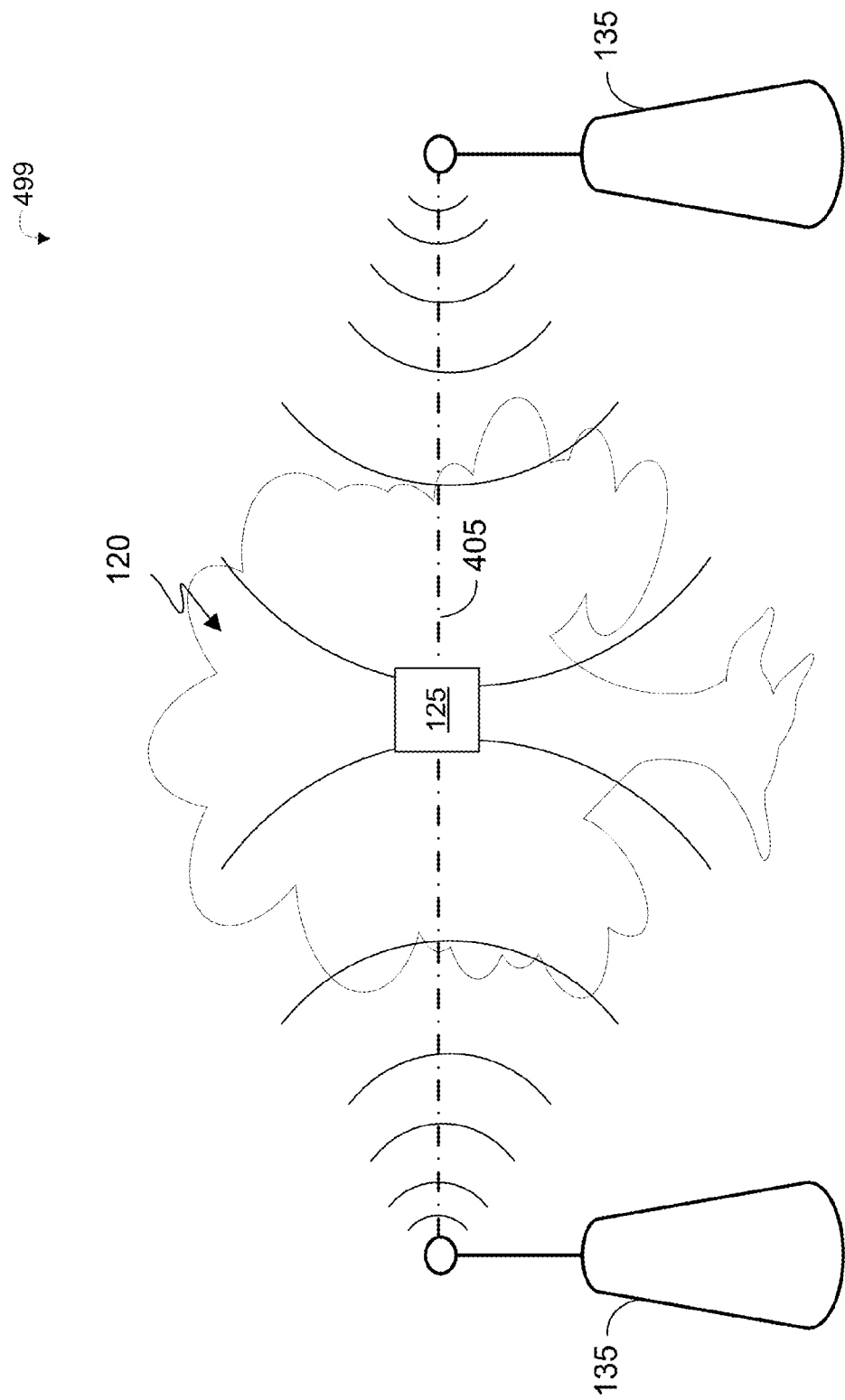
FIG. 4 is a schematic block diagram of the growth detection element in the crop sensor, in accordance with an embodiment of the present invention.

FIG. 4 is a schematic block diagram of the growth detection element, in accordance with an embodiment of the present invention. The growth detection element 499 includes a crop sensor 125 rigidly mounted onto a plant 120, with an RFID tag (not shown) enclosed within and being the functional part of the crop sensor 125. The RFID tag is used to carry the coded information, pertaining to growth and location. The growth detection element 499 also includes three or more growth sensors 135 communicating with crop sensor 125 through transmissions 405.

An RFID tag located within crop sensor 125 is a contactless automatic identification technology which automatically identifies an object by using a radio signal. Specifically, a RFID tag is embedded within crop sensor 125 and attached to crop 120, it communicates with three or more growth sensors 135 through transmissions 405, for example, via reception of the radio signals. The strength of the transmissions 405 in respect to two or more reference point allows to identify the locations of the sensor in space. Since multiple RFID tags may be within the reach of a single growth sensors 135, the ID may be associated with a specific plant at a specific time in order to determine the growth of the canopy. Identifying the ID and locations of the RFID tag may allow the reconstruction of growth data in order to determine how the canopy grows over a period of time and much of the growth is associated with canopy development.

In a preferred embodiment of the invention, the growth detection element 499 may be a wireless component of crop sensor 125 for determining the location of a fixed crop 120. It can comprise of three or more growth sensors 135 disposed on or around the target crop 120, an RFID tag for monitoring the change in the height of the crops canopy, and a wireless communication system operating on at least one Radio Frequency (RF) band configured to allow communication between the RFID tag and the three or more growth sensors 135. The three or more growth sensors 135 may then transmit the data location to the irrigation controller 140.

In an exemplary embodiment of the invention, the irrigation controller 140 may include a processor configured to find the RFID tags vertical or horizontal change by triangulation. The change may be calculated based on values of position information received from the RFID tag as its position changes during a growth cycle of a crop 120 and compared to previous values. The vertical or horizontal change may be associate with the growth of crop 120.

The irrigation controller 140 may determine triangulation based on successive values of the position information using at least three points $P_1$, $P_2$ and $P_3$ of the RFID tag respective of the three or more growth sensors 135. Triangulation may include the Received Signal Strength Indication (RSSI) method, based on using RF expansion equations, comparing the relative signal intensity received by the three or more growth sensors 135 from a single RFID tag. The location (coordinates) of the three or more growth sensors 135 is recorded at their initial installation. The irrigation controller 140 may also use the Time Difference on Arrival (TDOA) method, utilizing a single RFID tag and the three or more growth sensors 135, by measuring signals emitted from three or more synchronized transmitters at known locations. For exemplary purposes, the three or more growth sensors 135 may be regarded as each broadcasting pulses at exactly the same time on a separate frequencies (to avoid interference). The crop sensor 125 measures the TDOAs of the pulses, which are converted to range differences. The difference in the time of receiving the signals divided by the speed of light should be an indication of the difference in distances between the RFID tag and the three or more growth sensors 135, thereby allowing to calculate the tag's position. The processor may also include a triangulation technique that may account for erroneous readings caused by external factors such as weather, or wind gusts by correcting the position of the crop 120 based on the average speed of the motion of the RFID tag respective of the three or more growth sensors 135.

The computer control system 100 may also receive the three points $P_1$, $P_2$ and $P_3$ of the RFID tag attached to the crop 120 via the three or more growth sensors 135, directly.

The three or more growth sensors 135 may then provide the identifier read from the RFID tag to the computer control system 100. The computer control system 100 may then associate the determined geographical location with the data image transmitted by the photo detector element of the crop sensor 125. In response to the association, the sensor module 106 (see FIG. 1) may then reference the location notification to the zone control module 108 (see FIG. 1), thus associating the location of the crop 120 to the image data.

Returning to FIG. 4, showing the interaction of crop sensor 125 with crop 120 vegetation in the growth detection element 499. In operation, a radio signal is directed along a horizontal plane of the crop 120, it is then scattered or reflected by the crop 120. The signal is then measured as it returns to the three or more growth sensors 135. As stated above, the triangulation method may measure both the intensity of the returned signal and the time delay between transmission 405 of the pulse and its return. Since the speed of light is well-defined for a given atmosphere, the distance can be calculated from the three or more growth sensors 135 to the scattering target (crop 120). When a vegetation canopy is located above the ground, the light may be scattered from different elements of the canopy and from the ground beneath. By measuring the change in the intensity of the signal as a function of time, it is also possible to infer the vertical structure of the vegetation.

Each of the three or more growth sensors 135 may include a RF transmitter, and a RF receiver that operate in accordance with a wireless local area network protocol, an area network protocol, a wireless telephony protocol, a wireless data protocol, or other protocol. The three or more growth sensors 135 may also contain a wireless interface (for example, a Wi-Fi® interface) as used to communicate with different elements of the system.

Figure 5:
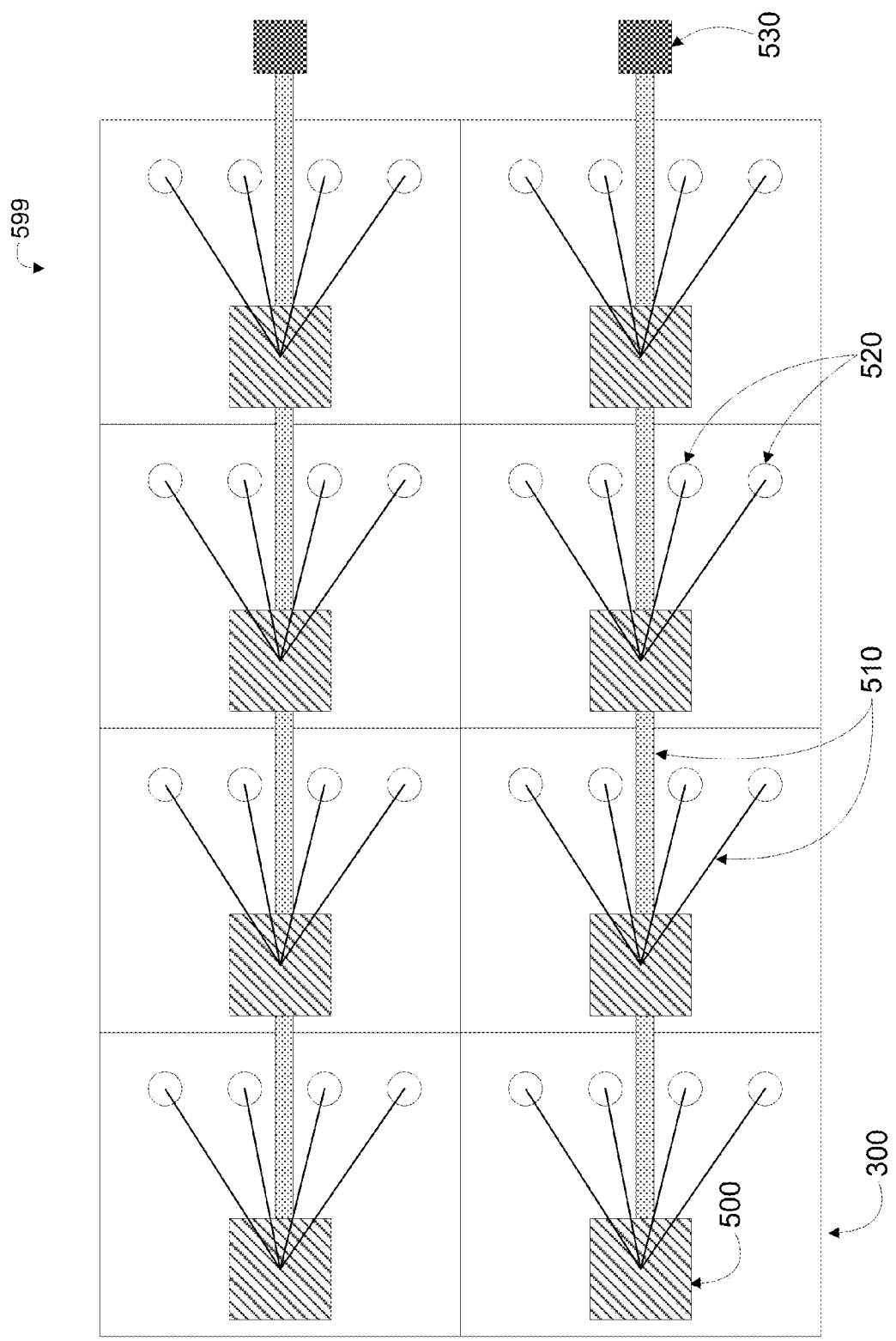
FIG. 5 is a schematic block diagram of the irrigation control system, in accordance with an embodiment of the present invention.

FIG. 5 is a schematic block diagram of the irrigation communication system, in accordance with an embodiment of the present invention. The irrigation communication system 599 include irrigation plots 300 containing irrigation control boxes 500, solenoid valves 520, and control gateways 530 all connected wirelessly or by wired communications network 510. Communication system 599 may be adapted to control the irrigation of crops over many irrigation plots 300. The use of wired or wireless communications network 510 may allow information and instructions to pass from an irrigation controller 140 (FIG. 1) to control gateways 520, irrigation control boxes 500, and solenoid valves 510 all within an irrigation plot 300.

In various embodiments, control gateways 520 may include a processor coupled to a memory, at least one input and an output. In some embodiments, connections between control gateways 520 and irrigation controllers 140 are coupled to the at least one input in order to provide signaling that corresponds to sensed or measured data. In some embodiments, the input may also function as an output allowing for bi-directional communication. Control gateways 520 may act generally to maintain irrigation schedules, store time synchronization values and match to irrigation controller 140 or computer control module 100 (FIG. 1), or store irrigation control instructions in memory. Control gateways 520 may send, as output, computer instructions to irrigation control boxes 500 to open or close solenoid valves 520. Instructions from control gateways 520 may be performed sequentially or simultaneously.

Communications network 510 may be wired, for example an RS-485 differential power line communication with a OFDM modulation or a standard CENELEC. Communications network 510 may be wireless, for example, a wireless ISM band of 900 MHz or 2.4 GHz frequencies. In various embodiments, a combination of wired and wireless communications network 510 may be used.

For example, an area of land containing multiple irrigation plots 300 may provide an area large enough for multiple data paths for communications network 510 to be implemented. Computer controller 100 may be connected wirelessly through communications network 510 to multiple zones controlled by a gateway(s) 520. Data paths being bi-directional, wired communication may transmit schedule data control boxes 500 and information aggregated from solenoid valves may be wirelessly transmitted to gateways 520.

In various embodiments, communication system 599 may be powered via solar power and generators (not shown) coupled to control boxes 500 at the end of each row or irrigation plots 300. Control boxes 500 may contain capacitors to hold a charge in order to power wired communication to solenoid valves 520.

In various embodiments, communication system 599 may employ an optimization algorithm in order choose the most optimal path to deliver the data from a central computing device, for example, computer control modules 100 or control gateways 530 to individual crop sites (not shown). The output of the optimization may assign various computer control modules 100 or control gateways 530 various irrigation schedules or implement resource distribution in various orders in order to achieve the more efficient resource distribution.

FIG. 6 is a block diagram of internal and external components within the computer control module of FIG. 4, in accordance with an embodiment of the present invention. It should be appreciated that FIG. 5 provides only an illustration of one implementation and does not imply any limitations with regard to the environments in which different embodiments may be implemented.

Computer control module 100 can include one or more processors 602, one or more computer-readable RAMs 604, one or more computer-readable ROMs 606, one or more tangible storage devices 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within a system.

One or more operating systems 610, irrigation module 104, sensor module 106, zone control module 108, and vegetation index module 110 are stored on one or more of the computer-readable tangible storage devices 608 for execution by one or more of the processors 602 via one or more of the respective RAMs 604 (which typically include cache memory). In the illustrated embodiment, each of the computer-readable tangible storage devices 608 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computer control module 100 may also include a R/W drive or interface 614 to read from and write to one or more portable computer-readable tangible storage devices 626. The irrigation module 104, sensor module 106, zone control module 108, and vegetation index module 110 can be stored on one or more of the portable computer-readable tangible storage devices 526, read via the respective R/W drive or interface 614 and loaded into the respective computer-readable tangible storage device 608.

Computer control module 100 can also include a network adapter or interface 616, such as a TCP/IP adapter card or wireless communication adapter (such as a 4G wireless communication adapter using OFDMA technology). Irrigation module 104, sensor module 106, zone control module 108, and vegetation index module 110 on computer control module 100 can be downloaded to the computing device from an external computer or external storage device via a network (for example, the Internet, a local area network or other, wide area network or wireless network) and network adapter or interface 616. From the network adapter or interface 616, the programs are loaded into the computer-readable tangible storage device 608. The network may comprise copper wires, optical fibers, wireless transmission, routers, firewalls, switches, gateway computers and/or edge servers.

Computer control module 100 may be connected to and receive and transmit data between the irrigation controller 140, crop sensors 125, and growth sensors 135 and may also include 435 a display screen 620, a keyboard or keypad 622, a microphone 625 and a computer mouse or touchpad 624. Device drivers 612 interface to display screen 620 for imaging, to keyboard or keypad 622, to microphone 625, to computer mouse or touchpad 624, and/or to display screen 620 for pressure sensing of alphanumeric character entry and user selections. The device drivers 612, R/W drive or interface 614 and network adapter or interface 616 can comprise hardware and software (stored in computer-readable tangible storage device 608 and/or ROM 606).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An automated irrigation control system comprising:
   one or more crop sensors physically attached to a crop, wherein the one or more crop sensors comprise a light sensitive sensor having a photo-detector for monitoring light intensity of a crop;
   an irrigation conduit extending along the span of an irrigation zone and adapted to carry fluid, wherein the irrigation conduit comprises one or more controllable valves and one or more crop sensors;
   three or more growth sensors placed in close proximity of the one or more crop sensors;
   a computer control system;
   an irrigation controller, coupled to the one or more crop sensors and the computer control system, that activates the one or more controllable valves, and receives data from the one or more crop sensors and the three or more growth sensors coupled to the irrigation controller; and
   a communications link between the computer control system, the one or more crop sensors, the three or more growth sensors, and the irrigation controller.

2. The system according to claim 1, wherein the crop sensor further comprises a radio frequency identification transmitter coupled thereto for transmitting a location of the crop sensor, and the crop's growth indication data.

3. The system according to claim 2, wherein the radio frequency identification transmitter comprises at least one of a passive transponder, or an active transponder.

4. The system according to claim 1, wherein the three or more growth sensors further comprise a radio frequency transmitter, and a radio frequency receiver.

5. The system according to claim 1, wherein the three or more growth sensors utilizes at least one of triangulation technology and signal strength technology to determine a position the crop sensor based on a reference point, and determine a growth rate value, based on the position, of one or more of the crop and a crop size value based on a crop canopy.

6. The system according to claim 1, wherein the computer control system further comprises;
- a sensing module configured for receiving crop data, a crop identification code, a crop growth rate data;
- a vegetation index module for comparing the obtained vegetation index, or indices with a reference values in determining crop health;
- a zone control module for determining the span of the irrigation zone based on a user input, or the determined crop health;
- an irrigation module for determining and transmitting irrigation schedule in response to the user input, or the determined crop health.

7. The system according to claim 1, wherein the irrigation controller is periodically calculating a resource need value, is configured with a schedule for controlling the irrigation system, and is computed by the computer control system, or by user input.

8. The system according to claim 1, wherein the irrigation controller maintains historical information as to water usage, or power usage and can transmit that information to the computer control system.

9. The system according to claim 1, wherein communication link comprises;
- a wireless sensor network, at the irrigation zone, the wireless sensor network comprising a plurality of nodes for performing at least one of monitoring crop health, crop location, or crop growth conditions and controlling the one or more controllable valves and sensors at the irrigation zone; and
- the computer control system located remotely from the irrigation zone, the computer control system coupled to each wireless sensor network over the communications link for receiving data from and controlling operation of the nodes.

10. The system according to claim 1, the photo-detector of the one or more crop sensor further comprising an external light source, wherein the external light source for monitoring light intensity of a crop.

11. A method for automated irrigation control, the method comprising;
- monitoring a light intensity of a crop;
- converting the light intensity of a crop into electronic data;
- analyzing the electronic data;
- measuring a crop growth parameter using the radio frequency identification based on a triangulation method;
- analyzing the growth parameter measurements to generate a normalized response function for the crop; and
- calculating a crop health value based on crop conditions, wherein crop conditions further comprise:
  - a reflection spectral image including the monitored light intensity;
  - a temperature value of the crop; and
  - an orientation of crop leaves during high heat periods;
- determining an irrigation schedule;
- adjusting the irrigation schedule based on forecasted weather data;
- adjusting the irrigation schedule based on the calculated health value of the crop based on the analyzed electronic data, the normalized response function, and time period;
- monitoring the light intensity of the crop over the time period and adjusting the irrigation schedule based on the calculated health value crossing a predetermined threshold, and
- activating one or more controllable valves for irrigation control according to each of the adjustments to the irrigation schedule.

12. The method in accordance with claim 11, wherein monitoring the light intensity of a crop comprises;
- detecting light of a visible wavelength through a filter of red, blue, green and infrared wavelengths, and wherein a calculation of a vegetative index corresponds to plant color, plant biomass, or combinations thereof.

13. The method in accordance with claim 12, wherein monitoring the light intensity of a crop comprises;
- detecting light of a visible wavelength through a dual filter comprising of red, and infrared wavelengths, and wherein the calculation of the vegetative index corresponds to plant color, plant biomass, or combinations thereof.

14. The method in accordance with claim 11, wherein converting the light intensity of a crop into electronic data comprises one or more of measuring the value level of light reflected by the crop from ambient light and calculating the temperature of the leaves.

15. The method in accordance with claim 11, wherein analyzing the electronic data comprises;
- calculating, a first vegetation index using detected light;
- calculating, a water invariant chlorophyll index from the first vegetative index using a plurality of spectral bands; and
- referencing, the first vegetation index to a second vegetation index, wherein the second vegetation index comprises past electronic data collected, and calculated from the same crop location; and
- determining, the crop health conditions.

16. The method in accordance with claim 15, wherein determining the irrigation schedule comprises;
- generating an irrigation schedule based on one or more crop health conditions, and the second vegetation index data for controlling application of irrigation.

17. The method of claim 16 wherein an irrigation schedule further comprises:
- obtaining a previous irrigation rates for the crop;
- assigning the irrigation rate for each grid cell of the crop;
- transmitting the irrigation rate and schedule to the irrigation controller;
- transmitting the irrigation schedule at one or more time period;
- periodically adjusting the irrigation schedule based on the crop sensors; and
- periodically adjusting the irrigation schedule based one or more of weather forecasting and the crop health.

18. The method in accordance with claim 15, further comprising:
- calculating the first vegetation index using a data correction algorithm;
- receiving, the calculated first vegetation index;
- calculating a water needed value based on the calculated first vegetation index; and
- determining resource distribution through an irrigation conduit based on the calculated first vegetation index.

* * * * *